United States Patent Office.

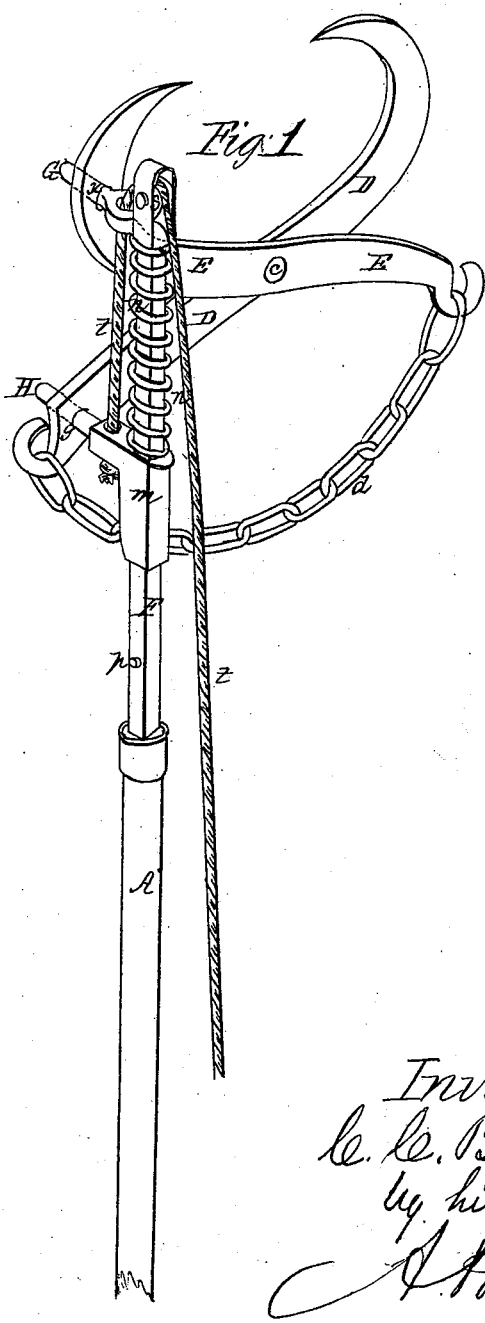

C. C. BLODGETT, OF WATERTOWN, NEW YORK.

Letters Patent No. 76,588, dated April 14, 1868

IMPROVEMENT IN CLUTCH FOR ELEVATING.

The Schedule referred to in these Letters Patent and making part of the same.

TO WHOM IT MAY CONCERN:

Be it known that I, C. C. BLODGETT, of Watertown, in the county of Jefferson, and State of New York, have invented certain new and useful Improvements in Devices for Elevating and Operating Clutches or Grapples for Sustaining Hay-Forks; and I hereby declare the following to be a full, clear, and exact description of the same, reference being had to the accompanying drawings.

It is well known that the tackle by means of which a horse hay-fork is usually suspended and elevated and lowered, is attached to a clutch which catches upon the beam or rafter from which it is desired to suspend the fork. This beam is oftentimes at quite a distance from the ground, and, in many instances, cannot be reached by ordinary means, so that it becomes a matter of some difficulty either to cause the clutch to catch upon the beam, or to disengage it therefrom.

The object I have in view is to overcome this difficulty, and to this end I employ a device which consists of two arms, attached to a handle of suitable length, and arranged to engage with the jaws of the clutch in the manner hereinafter described, so that, by means of said device, the clutch may be elevated towards the beam which it is to grasp, and its jaws be either forced and held open, or permitted to close, according as it is desired to engage the clutch with or disengage it from the beam.

To enable those skilled in the art to understand and use my invention, I will now proceed to describe the manner in which the same is or may be carried into effect, by reference to the accompanying drawings, which represent a perspective view of a clutch and device for elevating and operating the same.

The clutch-operating device consists of two arms or horns G H, which project from a rod, F, forming part of the handle A. The upper arm G is attached immovably to the rod F; the lower one, H, on the contrary, is attached to a sleeve, $m$, which slides upon the rod. Encircling that part of the rod between the two arms, is a spring, $n$, which presses down upon the sleeve $m$, whose downward movement is limited by a pin or stop, $p$, on the rod. The upper and lower arms G H project from the same side of the rod, and to the lower arm is secured a cord, $t$, which passes up loosely through the shoulder of the arm G, and over a pulley, $s$, mounted on the top of the rod F. The rope thence extends downwards, so as to be within convenient reach of the operator. By pulling on the rope, the sleeve $m$, with its arm H, will be raised toward the upper arm G, and if the strain on the rope be relaxed, the spring $n$ will force the sleeve down until it is stopped by the pin $p$.

This device is applied to the upper end of one clutch-jaw E, and the lower end of the other, D, a socket, $x\ y$, being formed in each for the reception of the arms. The operation is as follows:

When the tackle is attached to the chain $d$, and it is desired to engage the clutch with the beam or rafter from which the hay-fork is to be suspended, one of the arms, G, is inserted in the socket $x$ in the upper end of the jaw E, and the other arm H is inserted in the socket $y$ in the lower end of the jaw D. The clutch and clutch-operating device are now raised by means of the handle A, until the clutch is near the beam, when the operator pulls on the cord $t$, as represented in fig. 2, so as to raise the sleeve $m$ and arm H, and consequently the lower end of the jaw E, thus causing the clutch to open. As soon as one of the jaws of the open clutch has caught upon the beam, the operator loosens his hold on the cord $t$, whereupon the spring $n$ forces down the sleeve $m$ and arm H, closing the jaws, and causing the clutch to grasp the beam tightly. The arms G H, by means of the handle, are now drawn out from their sockets $x\ y$, and the clutch is ready for use.

Whenever it is desired to disengage the clutch from the beam, the clutch-operating device is raised until the arms G H can be inserted in their sockets $x\ y$. The operator then pulls down on the cord $t$, which, as above explained, causes the separation of the jaws D E, and admits of the clutch being readily disengaged and removed from the beam.

Having now described my invention, and the manner in which the same is or may be carried into effect, what I claim, and desire to secure by Letters Patent, is—

The clutch-elevating and operating device herein described of the accompanying drawings, arranged to operate in combination with a clutch or grapple, substantially in the manner and for the purposes shown and set forth.

In testimony whereof, I have signed my name to this specification before the subscribing witnesses.

C. C. BLODGETT.

Witnesses:
 J. F. MOFFETT,
 L. C. GREENLEAF.